United States Patent [19]

Tobol

[11] Patent Number: 5,006,842
[45] Date of Patent: Apr. 9, 1991

[54] IDENTITY INSERT BLOCK FOR ELECTRONIC MODULES

[75] Inventor: Nathan H. Tobol, Wrentham, Mass.

[73] Assignee: The Foxboro Company, Foxboro, Mass.

[21] Appl. No.: 363,664

[22] Filed: Jun. 8, 1989

Related U.S. Application Data

[63] Continuation of Ser. No. 37,756, Apr. 13, 1987, abandoned.

[51] Int. Cl.⁵ .............................................. H03K 17/94
[52] U.S. Cl. ................... 340/825.34; 341/22; 340/825.30
[58] Field of Search ........ 340/365 R, 365 VL, 365 S, 340/825.30, 825, 34, 825.35; 364/146; 341/22, 23, 28; 400/490, 492, 666; 200/5 B, 5 EA; 273/264, 271, 281, 282, 153 S, 156, 160

[56] References Cited

U.S. PATENT DOCUMENTS

| | | | |
|---|---|---|---|
| 3,863,931 | 2/1975 | Forsyth et al. | 273/156 |
| 4,032,931 | 6/1977 | Haker | 340/825.35 X |
| 4,422,641 | 12/1983 | Collin | 273/153 S |
| 4,468,612 | 8/1984 | Starr | 324/66 |
| 4,578,773 | 3/1986 | Desai et al. | 364/900 |

FOREIGN PATENT DOCUMENTS

| | | |
|---|---|---|
| 0057645 | 8/1982 | European Pat. Off. . |
| 203670 | 10/1983 | German Democratic Rep. . |
| 379344 | 8/1964 | Switzerland . |
| 2132802 | 11/1984 | United Kingdom . |

*Primary Examiner*—Kenneth Wieder
*Assistant Examiner*—Jack B. Harvey
*Attorney, Agent, or Firm*—Wigman & Cohen

[57] ABSTRACT

A multiple pin block having a distinct electrically readable pin pattern and a corresponding visually readable label is useful as an identifier for electronic modules and other elements in electrical networks. Differing blocks each with identifiable labels, and corresponding electrical pin patterns may be inserted in devices to identify and distinguish the differing network modules or lines and thereby facilitate assembly, maintenance, testing and operation.

31 Claims, 3 Drawing Sheets

| CHARACTER | PIN POSITION | | | | | | | |
|---|---|---|---|---|---|---|---|---|
| 0 | 0 | | | | | | 6 | |
| 1 | 0 | | | | | 5 | | |
| 2 | 0 | | | | 4 | | | |
| 9 | 0 | | | | 4 | 5 | 6 | |
| 3 | 0 | | | 3 | | | | |
| . | 0 | 1 | | | | | | |
| : | 0 | 1 | | | | 5 | 6 | |
| 4 | 0 | | | 3 | 4 | 5 | | |
| 5 | 0 | | 2 | | | | | |
| + | 0 | 1 | | | 4 | | 6 | |
| − | 0 | 1 | | | 4 | 5 | | |
| 6 | 0 | | 2 | | 4 | 5 | | |
| / | 0 | 1 | | 3 | | | 6 | |
| 7 | 0 | | 2 | 3 | | 5 | | |
| 8 | 0 | | 2 | 3 | 4 | | | |
| * | 0 | 1 | | 3 | | 5 | | |
| A | 0 | | | 3 | | 5 | 6 | |
| B | 0 | | | 3 | 4 | | 6 | |
| C | 0 | | 2 | | | 5 | 6 | |
| D | 0 | | 2 | | 4 | | 6 | |
| E | 0 | | 2 | 3 | | | 6 | |
| F | 0 | | 2 | 3 | 4 | 5 | 6 | |
| G | 0 | 1 | | 3 | 4 | | | |
| H | 0 | 1 | | 3 | 4 | 5 | 6 | |
| I | 0 | 1 | 2 | | | | 6 | |
| J | 0 | 1 | 2 | | | 5 | | |
| K | 0 | 1 | 2 | | 4 | | | |
| L | 0 | 1 | 2 | | 4 | 5 | 6 | |
| M | 0 | 1 | 2 | 3 | | | | |
| N | 0 | 1 | 2 | 3 | | 5 | 6 | |
| O | 0 | 1 | 2 | 3 | 4 | | 6 | |
| P | 0 | 1 | 2 | 3 | 4 | 5 | | |
| Q | 0 | | | | | 5 | 6 | 7 |
| R | 0 | | | | 4 | | 6 | 7 |
| S | 0 | | | | 4 | 5 | | 7 |
| T | 0 | | | 3 | | | 6 | 7 |
| U | 0 | | | 3 | | 5 | | 7 |
| V | 0 | | | 3 | 4 | 5 | 6 | 7 |
| W | 0 | | 2 | | | | 6 | 7 |
| X | 0 | | 2 | | 4 | 5 | 6 | 7 |
| Y | 0 | | 2 | 3 | | 5 | 6 | 7 |
| Z | 0 | | 2 | 3 | 4 | | 6 | 7 |
| # | 0 | 1 | | | 4 | 5 | 6 | 7 |
| (BLANK) | 0 | 1 | | 3 | | 5 | 6 | 7 |

FIG. 5

IDENTITY INSERT BLOCK FOR ELECTRONIC MODULES

This is a continuation of co-pending application Ser. No. 07/037,756 filed on Apr. 13, 1987 now abandoned.

TECHNICAL FIELD

The invention relates to electric module identifiers, and more particularly to plug insertable identifiers.

BACKGROUND ART

Electronic networks may spread over great distances connecting many modules and other connection points. Proper identification of the devices and connections is then a troublesome aspect in assembly and testing of the network. In particular where there is a multiplicity of modules and connections, it is difficult and time consuming to clearly identify where inputs are arriving from and where outputs should go. Currently, the problem is solved by associating a particular physical connection point, for example a slot in an equipment rack, with the required device or signal. The device is then confined to the single position. Any device, whether the assigned device or otherwise, which is installed in that position assumes that address. Replacement and replacement requires clearing the slot of the old device before a replacement device can be started. In addition, if any device must be relocated, reprogramming of several or all devices in the network may be required.

The objectives of the present invention are to support self-configuration and verification, provide information for on-line reconfiguration, allow modules to be installed in any available slot, provide an identification meaningful to the user, as opposed to confusable physical slot addressing, provide a basis for a configuration data base containing a list of variables, locations, and types for each network device, and allow the detection of common configuration errors, such as a mismatch between signal and input/output module. A further objective is to minimize the need for cable tags and to facilitate the replacement or relocation of input/output modules. A still further objective is to provide a module identifier useful for functional interaction with the associated device.

SUMMARY OF THE INVENTION

The present invention is a module identifier electrically readable by a processor, and preferrably visually readable and interchangeable by a user. The identifier is composed of one or more interchangeable inserts or blocks, one side of which is embossed with a single alphanumeric character or other symbol readable by a viewer, the opposite side has an electric pin pattern corresponding by a code to the embossed character and readable by electronic means. A complex label may be created by interlocking several blocks to form a module identifier as letters are assembled to spell a word. Thus the module identifier forms a label readable both by an operator and a processor. Module identifiers eliminate the need for physical location based addressing, such as a slot-based addressing.

BRIEF DESCRIPTION OF THE DRAWINGS

FIG. 5 shows a table of characters and associated pin patterns for invertible blocks.

Like items are numbered the same on the drawings.

BEST MODE FOR CARRYING OUT THE INVENTION

Figure 1:
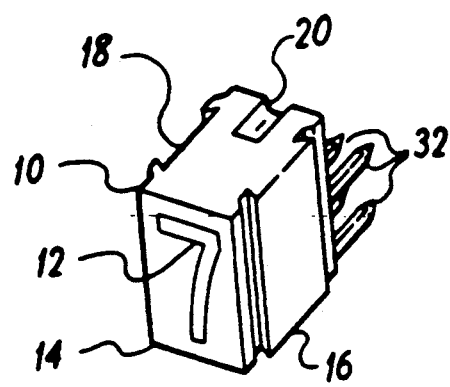
FIG. 1 shows a perspective front view of an interchangeable block.

FIG. 1 illustrates an interchangeable block. Generally, each interchangeable block is a small device with a single character or symbol embossed on the front surface. The rear surface has two or more pins that are electrically connected. The pins are arranged, sized and shaped to be plugged into a socket. Not all the pins are required and according to the presence or absence of pins in particular positions, a pattern is formed corresponding to the particular character or symbol embossed on the front surface.

The preferred form of manufacturing a block shown in FIG. 1, uses a base 10 of injection molded gray plastic modified polyethylene oxide. A particular visual character 12 is hot stamped on the front surface with an orientation identifier shown as a character underline 14.

A tongue 16 running vertically is formed on one side, and a corresponding groove 18 running vertically is formed on the opposite side. The symmetric tongue 16 and groove 18 portions formed on the sides enable several blocks to be interlocked as a unit, see FIG. 3. Separate blocks may then be assembled to form a module identifier with an identifying word or label across the front face of the module. The underline 14, tongue 16 and groove 18 patterns control proper orientation of individual inserts in the module identifier.

One or more guides may be formed along the block to orient proper insertion of the module identifier in a socket. Applicants prefer an upper groove 20 of a half cylindrical section extending along the upper surface partially from the rear surface towards the front surface of the block. When the block is properly aligned, a socket guide can, fit the full extension of the groove. If the block is incorrectly oriented, the lower surface with no groove encounters the socket guide thereby preventing insertion. Sockets without guides allow both right-side up and upside down insertion of the module identifier. By using the connection pattern shown in FIG. 5, the orientation of the module identifier can be determined electrically without regard to the right-side up or upside-down orientation thereof.

Figure 2:
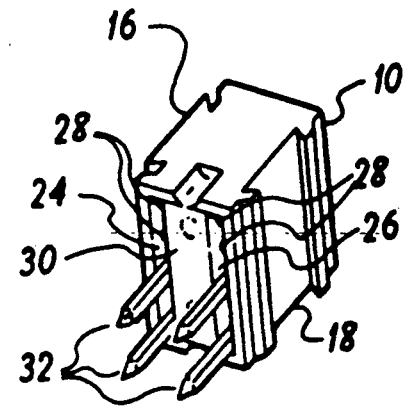
FIG. 2 shows a perspective rear view of an interchangeable block.

FIG. 2, shows a perspective rear view of an indicating block. On a rear surface of the base 10, two parallel slots 24, 26 are formed, with four regularly spaced notches 28 formed in each of the outside walls of the slots 24, 26 and extending perpendicular to the rear surface of the base 10. An elongated U-shaped nickle-plated steel shorting strip 30 is fitted in the parallel slots 24, 26 of the base and staked to the rear of the base 10. Particular notches 28 are selected according to a pin code relating the embossed front character 12 to a pin pattern. Brass pins 32 with a tin-lead coating are then pushed into the selected notches 28 and held in place between the shorting strip 30 and the base 10 to form a gas-tight electrical connection with the shorting strip 30.

In an alternative method of manufacture, an indicating block is made of injection molded nylon. The pins and shorting strip are stamped as one piece of formed brass. Unused pins are removed by shearing to create the designated pin pattern. Nylon is then injected about the shorting strip, and the visual character is hot stamped on the front surface.

In the preferred form, the indicating block has eight pin positions arranged in two rows and numbered 0 through 7. Each pin position may or may not have a pin in it. All pins are shorted together. Thus each pin pattern can be associated with an array of eight Boolean variables, C0 through C7 where Ci is 1, if the i'th pin position has a pin present, and 0 otherwise. The array is the pin code for the indicating block.

Numerous other pin support and pin cross connection methods are possible. The pins may be switched on the block forming a universal block. The number of pins is not limited to eight, nor is the pin arrangement limited to two parallel sets. The pin pattern may be formed other than by including or excluding pins. Another variation which merits mentioning. All pins may be present, but only those forming part of the pin code are electrically linked, as for example by a cover piece with a cross link pattern contacting only the appropriate pins. Also a single cross link pattern is not required. Pins may be arranged in several groups with each group being cross linked, but separate from other cross linked groups. Further while the preferred method develops signal returns by a spatial pattern, a return time pattern method is also possible, for example, the time between the returning signals would correspond to the block character.

Figure 3:
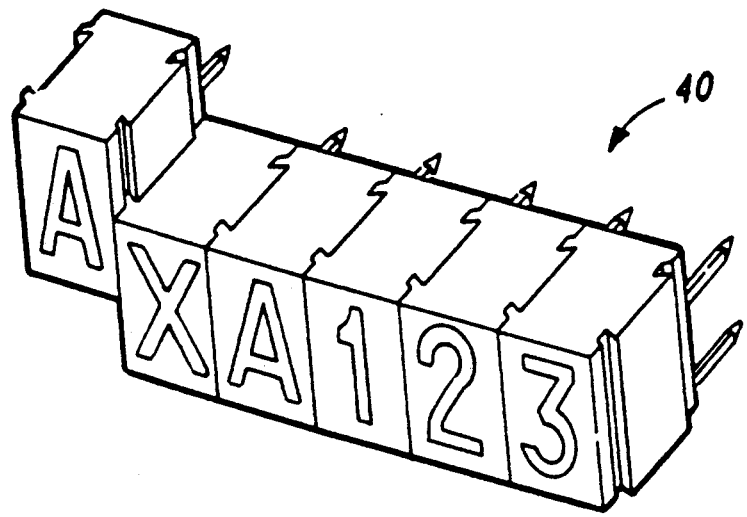
FIG. 3 shows a perspective view of several blocks linked together to form a module identifier.

FIG. 3 shows six blocks linked by the tongue 16 and groove 18 structures to form a single module identifier 40 with the label "AXA123" across the module's front. The single module identifier 40 acts as an insertable unit. The individual blocks then act as individual letters allowing meaningful words to be assembled as labels. The label may correspond to a plant location, a module function, or other user selected labeling scheme. Alphanumeric combinations such as "R12345", "water" and "H2O" may be used, and other symbols may be developed such as a water drop, valve symbol or others.

Modules may be located in an industrial environment in a variety of fashions making proper orientation of the module identifier 40 ambiguous, or difficult to read for a conveniently positioned human. To help resolve these problems, the sockets receiving the insert blocks or module identifiers may be constructed in two forms. One form allows inversion, and the other prohibits inversion. In the invertible format the pin patterns may be rotated half a turn and still be electically decipherable. The user then does not have to be concerned with orientation of the module identifier.

Figure 4:
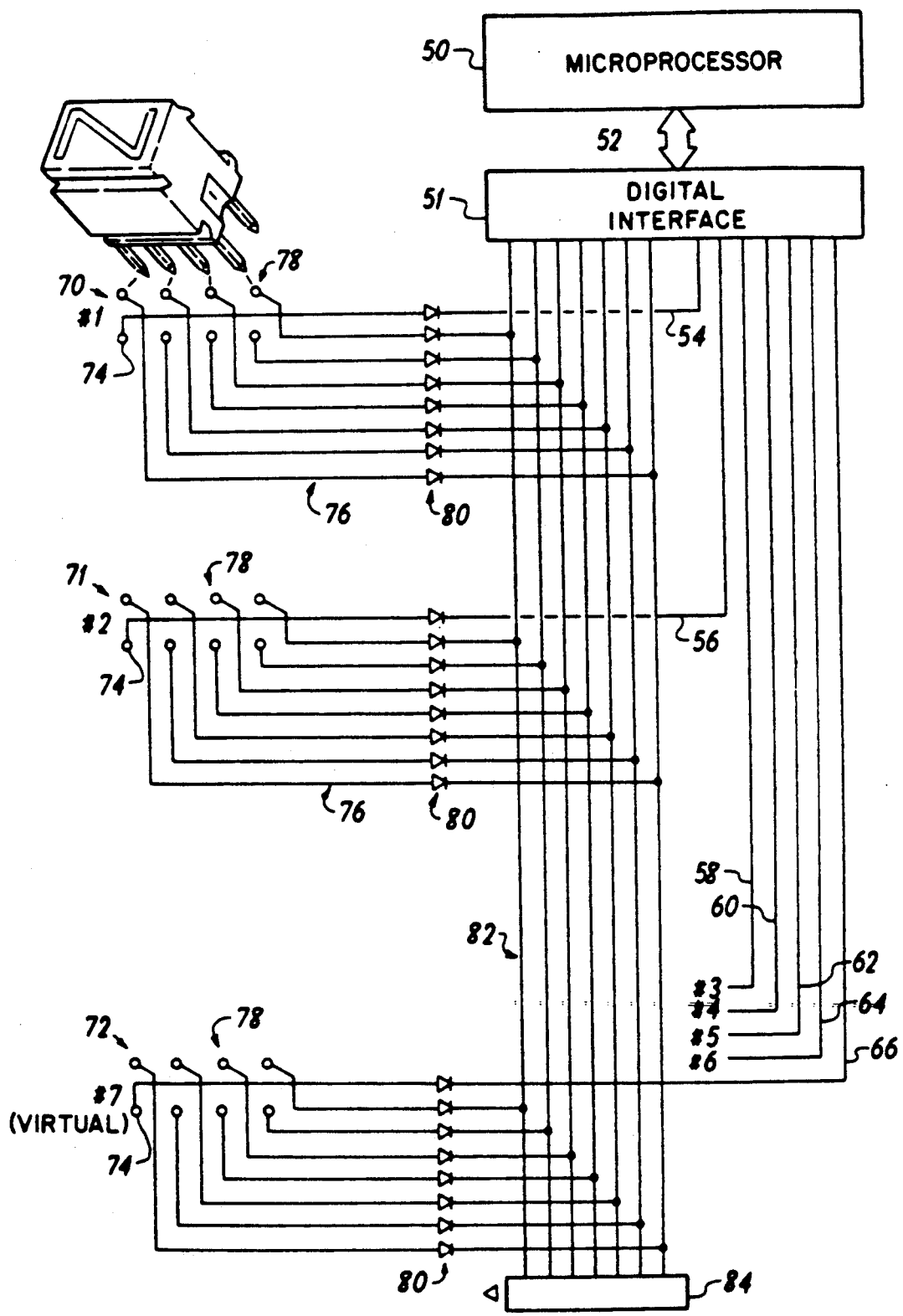
FIG. 4 shows an electric schematic for reading a module identifier.

FIG. 4 shows a circuit schematic for reading six blocks assembled as a module identifier 40, and a seventh virtual character. The virtual indicating block has no socket or physical location, and is encoded on the circuit dielectric within the termination connector. The seventh virtual character may be used to encode the termination connector type.

A microprocessor 50 including software issues read requests along a bus 52 to a digital interface 51. Extending from the digital interface 51 are commons lines 54–66, one each for each of the blocks (two shown, 70, 71) allowed in a module identifier and one for the virtual character 72. Six blocks are thought to form a convenient module identifier, so seven common lines 54–66 are shown. Each common line 54–64 contacts a zero contact 74 position in a socket for each associated block.

Similarly a seventh common line 66 connects to the zero contact 74 point of the virtual character 72. For each block socket, seven issuing lines 76 return from the remaining seven contact points 78 of each block socket through diodes 80 to seven response lines 82. Each response line 82 is then joined to one of the contact points 78 in each of the sockets. The seven response lines 82 in one direction return to the digital interface 51, and in the opposite direction extend to resistive loads 84 being controlled by the system. In the preferred embodiment, the microprocessor 50, digital interface 51 and module identifier 40 are located only a short distance apart as parts of a single module; however, it is possible that any or all may be located at great distance from each other.

To read an block character 70, a test signal is issued on the block common line 54 to the zero contact 74. The signal is passed by the shorting strip 30 of the block 70 to any pins present. Where there are pins present, the signal passes the issuing lines 76 and diodes 80 to the response lines 82. The pattern of the return signals is then determined by the presence or absence of a pin in the block completing the connection to the socket contact 78 and issuing line 76.

The seven response lines 82 are examined by the microprocessor 50 via the digital interface 51 for returned signals. The block's pin pattern is compared by the microprocessor 50 with a list held in the microprocessor's memory. When the pin pattern matches one in the list, the associated character is then known. The process of determining the module identifier label occurs similarly. Each block is examined in sequence to determine the block's character. As each block's character is identified the module identifier's label is built.

FIG. 5 shows the preferred embodiment of a table of characters and associated pin patterns for invertible blocks. A character is shown in the first column, and a corresponding pin code of eight pin positions is shown spanning the next eight columns. Each of the pin position columns for a character lists either a number when a pin is present in that position, or a blank when no pin is present in that position in the blocks. In the preferred embodiment, each pin code has a common pin position used for test signal input. The codes of FIG. 5 show the common pin in position zero corresponding to the zero contact 74. Pin codes are chosen to have an even number of pins (2, 4, 6, or 8) so each code has even parity. One-bit errors caused by pin contact failure are then detectable. Pin codes are otherwise chosen so that each distinguishable symbol is associated with a distinguishable pin pattern. The problem of recognizing which indicating block is present is then to determine which pin positions have pins present.

Indicating blocks when used in sockets with socket guides can be oriented in only one way. Since upside down characters are prohibited mechanically, there can be only one meaning for a detected pin pattern. The number of available patterns exceeds the number of letters and digits, so there are additional codes that can be used for special characters. Special symbols may include Greek, mathematical, chemical, or similar typographic characters; or may be pictorial or hieroglyphic characters. For example, a circuit switch schematic, or a water faucet icon.

FIG. 5 shows applicants' preferred table of codes for noninvertible module identifiers for the characters including the alphabet, the digits and nine other symbols.

The procedure for reading the indicating blocks of a module identifier is simple. There is always a pin in socket contact 0. Only the contact voltages at pins 1 through 7 are read with contact 0 held high. The procedure is to read a 7 bit array, Q[1] ... Q[7]. The array Q is effectively the same as the P0 array in the invertible module case. Q[0] is defined to be 1. Next, a table of codes is scanned for Q and returns a character LETTER plus a Boolean flag FOUND. If FOUND is false, an error is reported.

To facilitate the electrical decoding of the invertable indicating blocks, the common pins 0 and 7 are placed at diagonal corners of the pinout, making the common positions invariant with inversion. This shortens the list of available pin codes for character definition. Since in the preferred embodiment symmetrical pin configurations are not used, inversion of an indicating block causes the pin pattern to be transposed, yielding a different electrically readable code. Consequently, each invertible indicating block is assigned a pair of codes.

The method of reading invertible module identifiers is then to gather the pin pattern as before, and then search a list of pin codes for rightside up characters, and then search a list of pin codes for upside down characters. The rightside up and upside down characters pin code lists are constructed so the two do not include the same pin codes.

While there have been shown and described what are at present considered to be the preferred embodiments of the invention, it will be apparent to those skilled in the art that various changes and modifications can be made herein without departing from the scope of the invention defined by the appended claims, for example though most easily understood in terms of identifying a communications line, an indicating block is useable generally at any identifiable connection point having several signal path connections for either issuing signals to or receiving signals from a test point.

Another method of solving the ambiguity of inversion, though not preferred by applicants, is to establish a rule that each label include a orientation character. The orientation characters, which use nonsymetrical codes, could include among others A, B, C, D, E, F, G, J, K, P, R, T, U, V, and Y. A label composed of only X's and O's would then be disallowed. During software examination of the label, the nonsymetrical character is sought to determine the label's overall orientation. If no orientation character is found, an error is generated.

Module identifiers can serve other functions besides mere labeling. The function of the device may be called into action by the choice of a particular identifier. For example, industrial controllers commonly use proportional (P), integral (I), and derivative (D) functions in various combinations to control a process. Such a PID controller operating on a water line might then be labeled PIDH20 to produce all three functions. By replacing the I and D blocks with blank inserts, the label reads P.H20. A controller designed to look to the first three label characters for function definition is then altered to function as a proportional (P) only controller. Other function switching may occur by associating an available function with a particular block character either present in the label, or present in a particular label position. Methods for initiating or inhibiting available choices in a device by reading a character input are thought to be within the skill in the art.

What is claimed is:

1. A fixed connection identifier article for use with an electrical connection point having signal input and output channels, comprising:
   (a) a body having a plurality of surfaces forming top, bottom, and side faces, including a first surface having thereon at least one visible identifying symbol, a second surface having a plurality of electrical connection pins, and substantially parallel third and fourth surfaces, said third and said fourth surfaces each being characterized by at least one corresponding interlock surface area;
   (b) means for forming said input channel for receiving an electrical input signal, comprising at least one but less than all of said connection pins;
   (c) said output channel comprising the remainder of said connection pins; and
   (d) preselected, hard-wired electrical connections between the electrical input channel and at least one of the output channel connection pins.

2. A unique identity article for external electrical determination of an object, comprising:
   (a) a body having a plurality of surfaces forming top, bottom, and side faces, including a first surface having thereon at least one visible identifying symbol, a second surface having a plurality of electrical connection pins, and substantially parallel third and fourth surfaces, said third and said fourth surfaces each being characterized by at least one corresponding interlock surface area;
   (b) an electrical input channel adapted to receive an electrical identity request signal, comprising at least one and less than all of said connection pins;
   (c) an electrical output channel comprising the remainder of said connection pins; and
   (d) means for establishing hard-wired electrical connection between the electrical input channel and at least one of the electrical output channel connection pins,
wherein said means for establishing electrical connection is fixed and comprises a preselected pattern of connections corresponding to said visible identifying symbol.

3. The unique identity article as in claim 2, wherein said hard-wired, permanent electrical connections between the electrical input channel and the electrical output channel form a unique pattern to provide a unique electrical output and said first surface visible identifying symbol corresponds to said unique pattern.

4. Apparatus as in claim 3, wherein said unique electrical output is unchanged by physical orientation.

5. The unique identity article as in claim 3, wherein said visible identifying symbol is distinguishable in a normal position and in an inverted position.

6. The unique identity article as in claim 3, wherein said visible identifying symbol further includes a visually distinguishable orientation symbol.

7. Apparatus as in claim 2, wherein the object is an electrical module among a plurality of electrical modules.

8. Apparatus as in claim 2, wherein the object is an electrical connection among a plurality of electrical connections.

9. Apparatus as in claim 2, wherein the object is an electrical circuit among a plurality of electrical circuits.

10. Apparatus as in claim 2, wherein the object is an electrical article among a plurality of electrical articles.

11. The unique identity article as in claim 2, wherein said hard-wired, permanent electrical connections between the electrical input channel and the electrical output channel are mechanically inactuatable.

12. The unique identity article as in claim 2, wherein said hard-wired, permanent electrical connections between the electrical input channel and the electrical output channel form a keyless coding means.

13. The unique identity article as in claim 2, wherein said hard-wired, permanent electrical connections between the electrical input channel and the electrical output channel form a keyboardless coding means.

14. The unique identity article as in claim 2, wherein said third and fourth surfaces include corresponding tongue and groove surfaces.

15. The unique identity article as in claim 2, further including an interface unit and a processing unit, wherein said interface unit includes means for (i) issuing at least one test signal to said input channel, and for (ii) receiving at least one request signal and at least one response signal via said output channel; and wherein said processing unit includes means for (i) issuing said request signal to said interface unit for controlling the issuance of at least one test signal by the interface unit, for (ii) decoding the response signal, and for (iii) issuing an identification output signal.

16. The unique identity article as in claim 2, wherein said connection pins are substantially permanently connectable to a socket connector.

17. A system of unique identity elements for external electrical determination of an object, comprising a plurality of physically joined unique identity articles in combination to form a unique identity label, each of which identity article comprises:
   (a) a body having a plurality of surfaces forming top, bottom, and side faces, including a first surface having thereon at least one visible identifying symbol, a second surface having a plurality of electrical connection pins, and substantially parallel third and fourth surfaces, said third and said fourth surfaces each being characterized by at least one corresponding interlock surface area;
   (b) an electrical input channel adapted to receive an electrical identity request signal, comprising at least one and less than all of said connection pins;
   (c) an electrical output channel comprising the remainder of said connection pins and
   (d) means for establishing hard-wired electrical connection between the electrical input channel and at least one of the electrical output channel connection pins, wherein said means for establishing electrical connection is fixed and comprises a preselected pattern of connections corresponding to said visible identifying symbol,
wherein said plurality of unique identity articles are sequentially joined by said corresponding interlock surface areas.

18. The system of claim 17, wherein each of said hard-wired, permanent electrical connections between the electrical input channel and the electrical output channel form a unique pattern to provide a unique electrical output and said first visible identifying symbol corresponds to said unique pattern.

19. The system of claim 18, wherein said unique electrical output is unchanged by physical orientation.

20. The system of claim 18, wherein said visible identifying symbol is distinguishable in a normal position and in an inverted position.

21. The system of claim 18, wherein said visible identifying symbol further includes a visually distinguishable orientation symbol.

22. The system claim 17, wherein the object is an electrical module among a plurality of electrical modules.

23. The system of claim 17, wherein the object is an electrical connection among a plurality of electrical connections.

24. The system of claim 17, wherein the object is an electrical circuit among a plurality of electrical circuits.

25. The system of claim 17, wherein the object is an electrical article among a plurality of electrical articles.

26. The system of claim 17, wherein said hard-wired, permanent electrical connections between the electrical input channel and the electrical output channel are mechanically inactuatable.

27. The system of claim 17, wherein said hard-wired, permanent electrical connections between the electrical input channel and the electrical output channel form a keyboardless coding means.

28. The system of claim 17, wherein said hard-wired, permanent electrical connections between the electrical input channel and the electrical output channel form a keyless coding means.

29. The system of claim 17, wherein said third and fourth surfaces include corresponding tongue and groove surfaces.

30. The system of claim 17, further including an interface unit and a processing unit, wherein said interface unit includes means for (i) issuing at least one test signal to said input channel, and for (ii) receiving at least one request signal and at least one response signal via said output channel; and wherein said processing unit includes means for (i) issuing said request signal to said interface unit for controlling the issuance of at least one test signal by the interface unit, for (ii) decoding the response signal, and for (ii) issuing an identification output signal.

31. The system of unique identity elements as in claim 17, wherein the connection pins of each of said unique identity articles are substantially permanently connectable to a socket connector.

* * * * *